US011256589B2

(12) United States Patent
Jeansonne et al.

(10) Patent No.: US 11,256,589 B2
(45) Date of Patent: *Feb. 22, 2022

(54) DETECTING A CHANGE TO SYSTEM MANAGEMENT MODE BIOS CODE

(71) Applicant: HEWLETT-PACKARD DEVELOPMENT COMPANY, L.P., Spring, TX (US)

(72) Inventors: Jeffrey Kevin Jeansonne, Spring, TX (US); Boris Balacheff, Meudon (FR); Valiuddin Ali, Spring, TX (US); Chris I. Dalton, Bristol (GB); David Plaquin, Bristol (GB)

(73) Assignee: Hewlett-Packard Development Company, L.P., Spring, TX (US)

(*) Notice: Subject to any disclaimer, the term of this patent is extended or adjusted under 35 U.S.C. 154(b) by 208 days.

This patent is subject to a terminal disclaimer.

(21) Appl. No.: 16/503,887

(22) Filed: Jul. 5, 2019

(65) Prior Publication Data

US 2019/0332510 A1    Oct. 31, 2019

Related U.S. Application Data

(63) Continuation of application No. 15/329,877, filed on Jan. 27, 2017, now Pat. No. 10,387,651.

(51) Int. Cl.
| | |
|---|---|
| *G06F 21/56* | (2013.01) |
| *G06F 11/30* | (2006.01) |
| *G06F 21/57* | (2013.01) |
| *G06F 11/34* | (2006.01) |

(52) U.S. Cl.
CPC .......... *G06F 11/302* (2013.01); *G06F 21/566* (2013.01); *G06F 21/572* (2013.01); *G06F 11/3003* (2013.01); *G06F 11/3419* (2013.01); *G06F 11/3466* (2013.01); *G06F 21/575* (2013.01); *G06F 2201/81* (2013.01); *G06F 2201/865* (2013.01); *G06F 2201/88* (2013.01)

(58) Field of Classification Search
CPC ..... G06F 11/302; G06F 21/566; G06F 21/572
See application file for complete search history.

(56) References Cited

U.S. PATENT DOCUMENTS

| | | | |
|---|---|---|---|
| 7,984,286 B2 | 7/2011 | Zimmer et al. | |
| 8,296,579 B2 | 10/2012 | Piwonka et al. | |
| 8,353,058 B1 * | 1/2013 | McCorkendale | ....... G06F 21/56 726/34 |
| 8,533,445 B2 | 9/2013 | Wang et al. | |

(Continued)

FOREIGN PATENT DOCUMENTS

| | | |
|---|---|---|
| CN | 101079003 | 11/2007 |
| CN | 101140535 | 3/2008 |
| WO | WO-2013101083 A1 | 7/2013 |

OTHER PUBLICATIONS

Andrew Regenscheid and Karen Scarfone, "BIOS Integrity Measurement Guidelines (Draft)," NIST, Special Publication 800-155, Dec. 2011, pp. 1-47.

*Primary Examiner* — Albert Wang
(74) *Attorney, Agent, or Firm* — HPI Patent Department

(57) ABSTRACT

Examples herein disclose monitoring an expected functionality upon execution of a system management mode (SMM) code. The examples detect whether a change has occurred to the SMM code based on the monitoring of the expected functionality. The change indicates that the SMM code is compromised.

14 Claims, 6 Drawing Sheets

(56) References Cited

U.S. PATENT DOCUMENTS

| | | |
|---|---|---|
| 2008/0163212 A1 | 7/2008 | Zimmer et al. |
| 2009/0292949 A1 | 11/2009 | Quach et al. |
| 2010/0042821 A1 | 2/2010 | Harmer |
| 2010/0169967 A1 | 7/2010 | Khosravi et al. |
| 2011/0093690 A1 | 4/2011 | Vyssotski et al. |
| 2012/0297057 A1 | 11/2012 | Ghosh et al. |
| 2012/0297177 A1 | 11/2012 | Ghosh et al. |
| 2014/0173689 A1 | 6/2014 | Klustaitis et al. |
| 2015/0163121 A1* | 6/2015 | Mahaffey ............ H04W 12/12 707/687 |
| 2016/0328561 A1 | 11/2016 | Tamir et al. |
| 2017/0180399 A1 | 6/2017 | Sukhomlinov et al. |

* cited by examiner

DETECTING A CHANGE TO SYSTEM MANAGEMENT MODE BIOS CODE

RELATED U.S. APPLICATION DATA

This is a continuation of U.S. application Ser. No. 15/329,877, filed on Jan. 27, 2017, hereby incorporated by reference.

BACKGROUND

A computing system can include code, such as a Basic Input/Output System (BIOS) to perform various startup functions of the computing device. The BIOS code may initialize and test hardware of the computing device and as such, the BIOS code may load bootstrap code and/or an operating system from a memory of the computing device.

BRIEF DESCRIPTION OF THE DRAWINGS

In the accompanying drawings, like numerals refer to like components or blocks. The following detailed description references the drawings, wherein.

DETAILED DESCRIPTION

Figure 1:
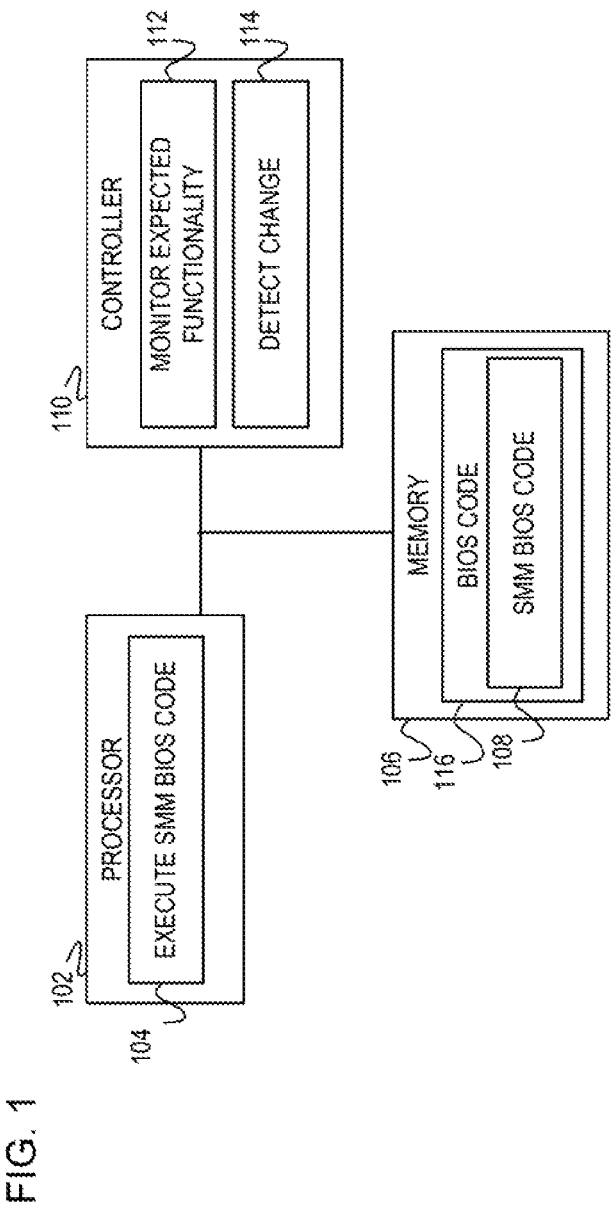
FIG. 1 is a block diagram of an example system including a processor to execute SMM BIOS code from a memory and a controller to monitor an expected functionality upon the execution SMM BIOS code for detecting a change to the SIMM BIOS code indicating the SMM BIOS code has been compromised.

BIOS code may be executed to configure and test hardware within a computing device. As such, the BIOS code may include system management mode (SMM) BIOS code. The SMM BIOS code runs at a highest level of privilege so once the SMM BIOS code has been compromised, it may be infeasible to detect a breach to the SMM BIOS code. Thus, this may lead to the computing device executing the compromised SMM BIOS code which may further lead to sub-standard operation of the BIOS code. Other mechanisms provide protection when the BIOS code starts execution upon resume from a low powered state, such as during pre-execution of the BIOS code; but these mechanisms may not provide protection against attacks which may target modification of the SMM BIOS code during execution. Further these mechanisms protect against attacks when the computing device is in a low powered state and may not provide protection while the computing device remains in a continuous on-state for an extended period of time.

To address these issues, examples disclosed herein provide a controller to monitor an expected functionality upon execution of the SMM BIOS code by a processor. The expected functionality is a behavior or functionality within a computing device which may occur as a result of execution of the SMM BIOS code. In this manner, the expected functionalities are those behaviors and/or functionalities which may be anticipated upon execution of the SMM BIOS code. For example, a developer may include this functionality or behavior as part of the SMM BIOS code, thus creating a transparency to execution of the SMM BIOS code. Further, monitoring this expected functionality enables the controller to monitor the functionality which may result upon execution of the SMM BIOS code.

Additionally, monitoring the expected functionality of the SMM BIOS code during execution enables the controller to detect whether a change has occurred to SMM BIOS code. Detecting the change to the SMM BIOS code enables an identification of whether the SMM BIOS code has been compromised. Identifying whether the SMM BIOS code has been compromised indicates the SMM BIOS code may be corrupt and/or may include an unauthorized modification of the SMM BIOS code. Executing the compromised SMM BIOS code may present additional vulnerabilities and/or may lead to sub-standard operation of BIOS code. Additionally, detecting whether the SMM BIOS code is compromised may be used to strengthen the SMM BIOS code for more security critical functions, such as monitoring a hypervisor and providing other more critical services.

In another example discussed herein, the controller detects the change to the SMM BIOS code through detecting a deviation to the expected functionality. The deviation is a functionality which is unexpected from execution of the SMM BIOS code. As such, the deviation may include an absence and/or change to those functionalities which are anticipated based on the execution of the SMM BIOS code. For example, assume the expected functionality includes writing a specific value to one of the registers, thus the controller checks to verify if the specific value is in that register. If there is no specific value or if the value is something other than the specific value, this indicates the deviation in the expected functionality. Detecting the deviation in the functionality and/or behavior from the execution of the SMM BIOS code enables the controller to detect whether the SMM BIOS compromised.

Thus, examples disclosed herein provide a mechanism to detect whether SMM BIOS code has been compromised by monitoring an expected functionality during execution of the SMM BIOS code.

Referring now to the figures, FIG. 1 is a block diagram of an example computing device including a processor 102 which may access a memory 106 for executing SMM BIOS code at module 104. Upon executing the SMM BIOS code 108 at module 104, a controller 110 monitors an expected functionality occurring from execution of the SMM BIOS code 108. The controller 110 monitors the expected functionality at module 112 to detect a change to the SMM BIOS code 108 at module 114. The memory 106 maintains BIOS code 116 including SMM BIOS code 108 for execution by the processor 102. At module 114 by detecting the change to the SMM BIOS code 108, the controller 110 detects whether the SMM BIOS code 108 has been compromised. The change to the SMM BIOS code 108 indicates the SMM BIOS code 108 has been compromised, meaning the SMM BIOS code 108 may be corrupt and/or may include an unauthorized modification of the SMM BIOS code 108. Thus, execution of the compromised SMM BIOS code by the processor 102 may lead to sub-standard operation of the BIOS code 116 and may present additional vulnerabilities of the computing device.

FIG. 1 illustrates the processor 102, the controller 110, and the memory 106 as components internal to a computing device. The computing device is an electronic device that may be programmed to can out a set of operations and/or functions. As such, implementations of the computing device include a target device, mobile device, personal computer, desktop computer, laptop, tablet, portable device, smart phone, wearable computing device, gaming device, smart television, retail point of sale device, or other type of electronic device including the processor 102, the controller 110, and the memory 106.

The processor 102 is a hardware component internal to the computing device which executes the SMM BIOS code at module 104. Although FIG. 1 illustrates the processor 102 as executing the SMM BIOS code at module 104, implementations should not be limited as this was done for illustration purposes. For example, the processor 102 may retrieve the BIOS code 116 form the memory 106 and execute boot strap information of the BIOS code 116 prior to execution of the SMM BIOS code 108. In this example, the boot strap information includes pre-execution information in which the processor 102 powers on from a low powered state. Thus, the processor 102 is a powered on-state when transitioning from executing the boot strap information to executing the SMM BIOS code 108 at module 104. Implementations of the processor 102 may include, by way of example, a processing unit, host processor, microprocessor, semiconductor, integrated circuit, or other type of electronic device capable of retrieving the SMM BIOS code 108 from the memory 106 and executing the SMM BIOS code at module 104.

At module 104, the processor 102 executes the SMM BIOS code 108 from the memory 106. Module 104 includes the processor 102 retrieving the SMM BIOS code 108 from the memory 106 for execution, accordingly. Upon the execution of the SMM BIOS code at module 104, the processor 102 may transmit a signal to the controller 110. The signal indicates to the controller 110 to monitor the expected functionality resulting from the execution of the SMM BIOS code 108. Thus if the processor 102 has not yet begun execution of the SMM BIOS code 108, the controller will be unable to monitor the resulting expected functionality at module 104. The module 104 may include an instruction, set of instructions, process, operation, logic, technique, function, firmware, and/or software executable by the processor 102 for execution of the SMM BIOS code 108.

The memory 106 is a storage area within the computing device which maintains the BIOS code 116 and as such, is accessible by the processor 102. In another implementation, the memory 106 is accessible by the processor 102 but not accessible by the controller 110. The processor 102 accesses the memory 106 for retrieval of the BIOS code 116 including the SMM BIOS code 108 for execution. Although FIG. 1 illustrates the memory 106 as a separate component from the processor 102, this was, done for illustration purposes as the memory 106 may be included as part of the processor 102. Implementations of the memory 106 include, by way of example, read-only memory, flash memory, ferroelectric memory, ferroelectric RAM, magnetic storage memory, nanodrive, storage drive, memory component, or combination of such memory components to maintain the BIOS code 116 and SMM BIOS code 108.

The BIOS code 116 is an interface used to initialize and test hardware components as consistent mechanism for an operating system (not illustrated) to interface with a keyboard, display, and other devices associated with the computing device. The BIOS code 116 is maintained in the memory 106 and upon execution may load may load an operating system (not illustrated) from the memory 106. Although FIG. 1 illustrates the BIOS code 116 as including the SMM BIOS code 108 implementations should not be limited as the BIOS code 116 may further include boot strap information and other pre-execution code.

The SMM BIOS code 108 is an operating mode in specially-implemented firmware is executed in high privileged mode by the processor 102. The SMM BIOS code 108 handles system-wide functions such as power management, system hardware control, or proprietary original equipment manufacturer designed code. For example, uses of the SMM BIOS code 108 include system events like memory errors, chipset errors, manage system safety functions including a power down of the processor 102, control power management operations, etc. The SMM BIOS code 108 may be triggered by a system interrupt to the processor 102 indicating to execute the SMM BIOS code 108. This may occur upon the completion of execution of the boot strap information of the BIOS code 116. This implementation is discussed in detail in a later figure.

The controller 110 is a hardware component capable of monitoring the expected functionality upon the processor 102 executing the SMM BIOS code 108 at module 104. Upon monitoring the expected functionality, the controller 110 detects whether the SMM BIOS code 108 may have undergone the change which may compromise the SMM BIOS code 108. Implementations of the controller 110 may include, by way of example, an embedded controller, microcontroller, semiconductor, electronic device, microchip, chipset, or other type of hardware component capable of monitoring the expected functionality resulting from execution of the SMM BIOS code 108 for detecting the change to the SMM BIOS code 108.

At modules 112-114, the controller 110 monitors the expected functionality upon the execution of the SMM BIOS code 108 by the processor 102. Upon monitoring the expected functionality when the processor 102 executes the SMM BIOS code, the controller 110 detects whether the SMM BIOS code has undergone a change. Detecting the change to the SMM BIOS code 108 implies the SMM BIOS code 108 may be compromised, meaning the SMM BIOS code 108 may be corrupt and/or include an unauthorized modification. In an implementation, the detection of the change to the SMM BIOS code 108 may include detecting a deviation in the expected functionality. The deviation is an unexpected functionality which occurs when the processor 102 executes the SMM BIOS code 108. For example, a developer generates the SMM BIOS code 108 in such a manner that when the processor 102 executes this code 108, there are certain behaviors that occur upon the execution of the SMM BIOS code 108. The deviation may include an absence and/or change to those certain behaviors. This creates a transparency to the execution of the SMM BIOS code 108. Detecting the deviation indicates a change to the SMM BIOS code 108 and hence further indicating the compromised SMM BIOS code 106. This implementation is discussed in detail at a later figure. The modules 112-114 may include an instruction, set of instructions, process, operation, logic, technique, function, firmware, and/or software executable by the controller 110 for monitoring the expected functionality when the processor 102 executes of the SMM BIOS code 108.

Figure 2:
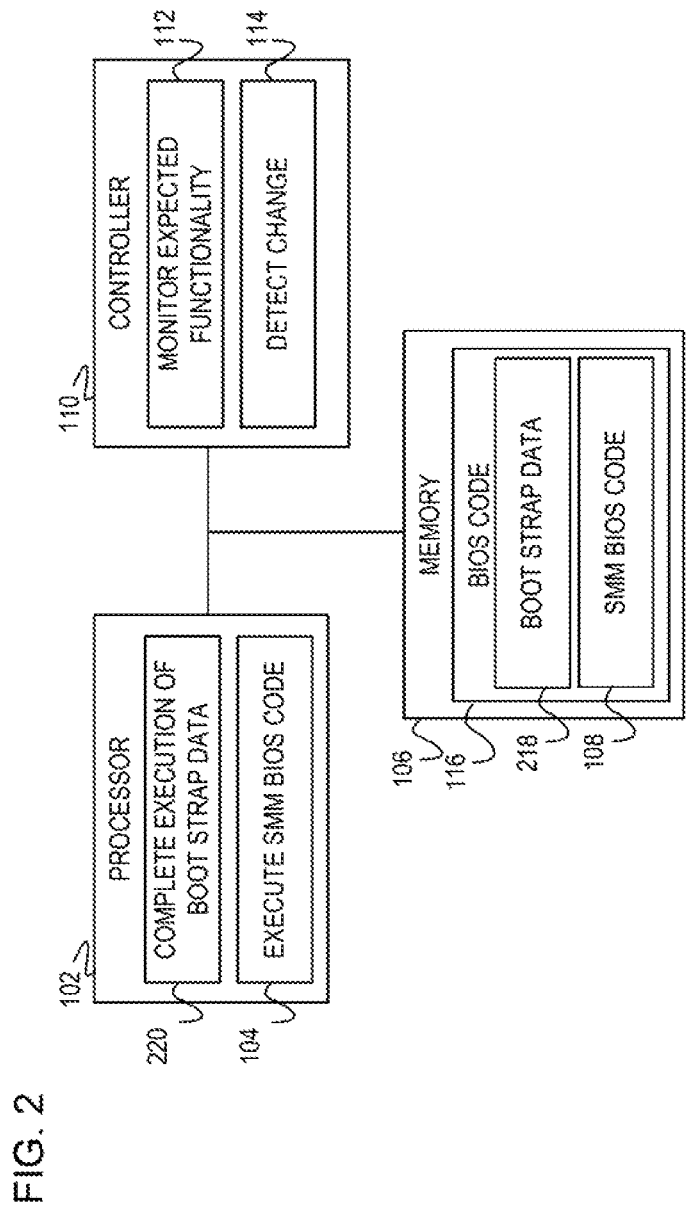
FIG. 2 is a block diagram of example system including a processor to complete execution of boot strap data prior to a controller monitoring an expected functionality of the system upon execution of SMM BIOS code.

FIG. 2 is a block diagram of an example computing device including a processor 102 to complete execution of boot strap data 218 at module 220 from a memory 106 prior to execution of SMM BIOS code 108 at module 104. The processor 102 transmits a signal to the controller 110 signifying the completion of the boot strap information at module 220. The signal from the processor 102 indicates to the controller 110, the processor 102 is entering the SMM BIOS mode for execution of the SMM BIOS code 108 at module 104. The computing device includes a controller 110 which monitors an expected functionality of the SMM BIOS code 108 at module 112. The controller 110 monitors the expected functionality at module 112 when the processor 102 executes the SMM BIOS code 108 at module 104. Monitoring the expected functionality at module 112, the expected functionality resulting from execution of the SMM BIOS code 108 at module 104 enables the controller 110 to detect the change to the SMM BIOS code 108 at module 114. Detecting this change indicates that the SMM BIOS code 108 may be compromised, meaning the SMM BIOS code 108 may be corrupt and/or may include an unauthorized modification. Executing the compromised BIOS code may lead to sub-standard operation of the BIOS code 116 and present additional vulnerabilities to the computing device.

The boot strap data 218 is considered part of the BIOS code 116 which is accessed from the memory 106. Upon execution of the hoot strap data 218, the processor 102 transitions from a low powered state, such as hibernation, sleep, etc. into a higher powered state, such as the on-state. During this transition, the processor 102 may be asleep and transitions into an operating state. The boot strap data 218 includes pre-execution information which the processor 102 executes on resume from the low powered state. Thus, the boot strap data 218 initiates a boot sequence of the computing device and may include, by way of example, processing data for performing self-tests, loading configuration settings, loading software and/or firmware, etc. The processor 102 remains in a continuous powered on state when transitioning from executing the boot strap data 218 to executing the SMM BIOS code 108. This indicates the processor 102 has been on for a continuous period of time if the controller 110 determines the processor 102 has yet to complete execution of boot strap data 218 at module 220, this means the processor 102 has not entered the SMM BIOS mode for execution of the SMM BIOS code 108. Thus, the controller 110 will be unable to monitor the excepted functionality at module 112.

At module 220, the processor 102 completes execution of the boot strap data 218, thus enabling the processor 102 to proceed to execute the SMM BIOS code 108 from the memory 106. Upon completion of execution of the boot strap data at module 220, the processor 102 may transmit a signal interrupt thus indicating to the controller 110 to monitor the expected functionality at module 112. The module 220 may include an instruction, set of instructions, process, operation, logic, technique, function, firmware, and/or software executable by the controller 110 for completing the execution of the boot strap data 218.

Figure 3:
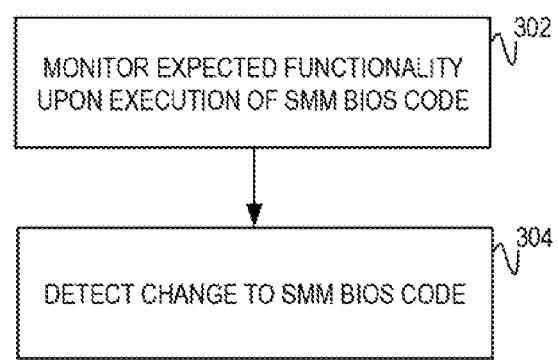
FIG. 3 is a flowchart of an example method executable by a controller to monitor an expected functionality of a computing system during execution of SMM BIOS code to detect a change in the SMM BIOS code, the change indicates that the SMM BIOS code is compromised.

FIG. 3 is a flowchart of an example method executable by a controller for monitoring an expected functionality when a processor executes SMM BIOS code. The controller monitors the expected functionality which may result from execution of the SMM BIOS code to detect a change in the SMM BIOS code. The change indicates the SMM BIOS code may have been compromised and as such may have undergone an unauthorized modification indicating the SMM BIOS code may have suffered an attack and/or corruption. In discussing FIG. 3, references may be made to the components in FIGS. 1-2 to provide contextual examples. For example, the processor 102 as in FIGS. 1-2 executes the SMM BIOS code resulting in the expected functionality. In another example, the controller 110 as in FIGS. 1-2 executes operations 302-304 to monitor the expected functionality upon execution of the SMM BIOS code for detecting whether there was a change to the SMM BIOS code. Further, although FIG. 3 is described as implemented by the controller, it may be executed on other suitable components. For example, FIG. 3 may be implemented in the form of executable instructions on a machine-readable storage medium 604 as in FIG. 6.

At operation 302, the controller monitors the expected functionality when the processor executes the SMM BIOS code. At operation 302, the processor transmits a signal to the controller indicating when the processor is entering the SMM BIOS mode and thus executing the SMM BIOS code. In response to receiving this signal, the controller monitors the expected functionality during the execution of the SMM BIOS code. The expected functionality is a behavior that may occur as a result of execution of the SMM BIOS code. As such, the behavior may be observable through line by line of SMM BIOS code or upon completion of the SMM BIOS code. For example, a developer may create this particular behavior as part of the SMM BIOS code, thus creating the observability or transparency of the execution of the SMM BIOS code. Monitoring this particular behavior enables the controller to monitor the functionality which results upon the execution of the SMM BIOS code. In one implementation, the controller determines if the processor has completed execution of the boot strap information prior to monitoring the expected functionality upon the execution SMM BIOS code. In another implementation, the controller monitors at least one of: tracking how often the processor executes the SMM BIOS code; an amount of time the processor spends executing the SMM BIOS code; monitoring settings of particular registers; and tracking a number of I/O cycles generated from execution of the SMM BIOS code. These examples are described in detail in a later figure. Monitoring the expected functionality through execution of the SMM BIOS code, the controller detects the change to the SMM BIOS code as at operation 304.

At operation 304, the controller detects the change to the SMM BIOS code through observing the expected functionality during execution of the SMM BIOS code. This change to the SMM BIOS code indicates the SMM BIOS code has been compromised, meaning the SMM BIOS code may be corrupt and or may include an unauthorized modification of the SMM BIOS code. Executing the compromised code may lead to sub-standard operation of the BIOS code. The controller detects the change to the SMM BIOS code during indirect monitoring of the SMM BIOS code, in indirect monitoring, the developer programs particular functionalities within the BIOS code. These particular functionalities are expected functionalities as these functionalities are anticipated according to the execution of the SMM BIOS code. The controller anticipates these expected functionalities by tracking the expected functionalities. If there is a deviation or unexpected functionality, this indicates the change to the SMM BIOS code and hence the compromised SMM BIOS code. This implementation is discussed in detail in the next figure.

Figure 4:
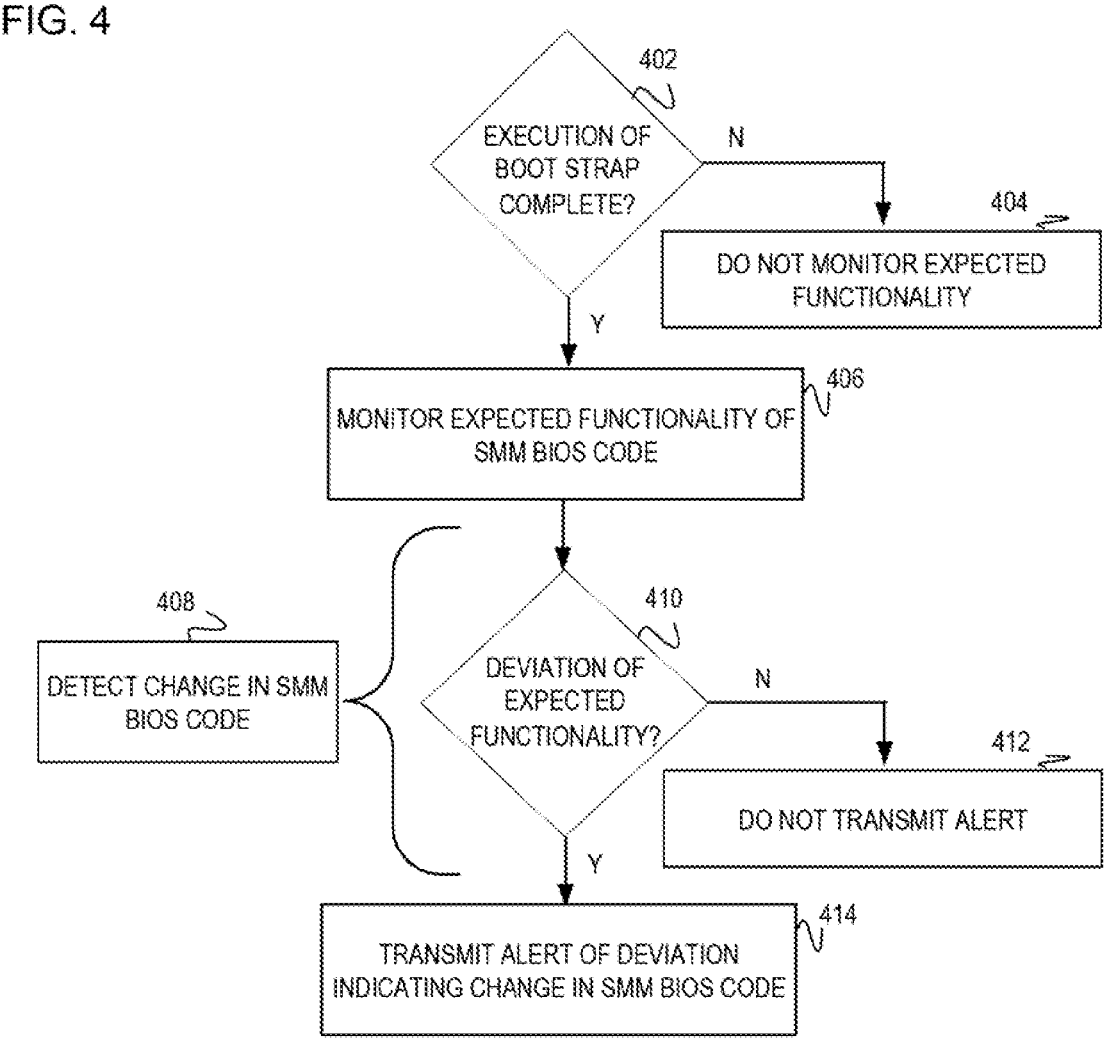
FIG. 4 is a flowchart of an example method executable by a controller to determine whether execution of boot strap information is complete and if so, the controller monitors an expected functionality upon execution of SMM BIOS code, the controller detects a change in the SMM BIOS code by monitoring the expected functionality.

FIG. 4 is a flowchart is a flow chart of an example method executable by a controller to determine whether execution of boot strap information by a processor is complete. If the execution of the boot strap information is complete, the processor proceeds to execute the SMM BIOS code while this signals to the controller to monitor an expected functionality. The controller monitors the expected functionality for detecting a change to the SMM BIOS code. The controller detects the change to the SMM BIOS code by monitoring whether there may be a deviation in the excepted functionality. If the controller detects the deviation, the controller may proceed to transmit an alert of the deviation. The deviation indicates the change in the SMM BIOS code further indicating the SMM BIOS code has been compromised. Monitoring the expected functionality for the deviation is a behavioral analysis of the SMM code such that functionality is observable to confirm the functional integrity and detecting whether a change has occurred to the functionalities and thus the SMM BIOS code. In discussing FIG. 4, references may be made to the components in FIGS. 1-2 to provide contextual examples. For example, the processor 102 as in FIGS. 1-2 executes the boot strap information and the SMM BIOS code. In another example, the controller 110 as in FIGS. 1-2 executes operations 402-414 to detect whether there was a change to the SMM BIOS code. Further, although FIG. 4 is described as implemented by the controller, it may be executed on other suitable components. For example, FIG. 4 may be implemented in the form of executable instructions on a machine-readable storage medium 604 as in FIG. 6.

At operation 402, the controller determines if the processor has completed execution of the boot strap information. The boot strap information includes pre-execution information which the processor executes on resume from a low powered state. Thus, the boot strap information initiates a boot sequence of the computing device and as such, refers to the process of loading the BIOS code into the memory for execution by the processor once the processor is powered on. By way of example, the boot strap information includes processing data for performing self-tests, loading configuration settings, loading software and/or firmware, etc. In this manner, the computing device pulls itself up by its boot straps. Specifically, the boot strap information also referred to as booting, refers to the process of loading the BIOS code into a memory of the computing device for execution by the processor. Determining if the execution of the boot strap information is complete, means the processor is in a continuous on-state from executing boot strap information to proceeding to execute the SMM BIOS code. If the controller determines the processor has yet to complete execution of the boot strap information, the controller does not proceed to monitor the expected functionality caused by execution of the SMM BIOS code as at operation 404. If the controller determines the processor has completed execution of the boot strap information, this indicates the processor has been on for a continuous period of time and the controller may proceed to operation 406.

At operation 404, upon determining the processor is not yet completed execution of the boot strap information of the BIOS code at operation 402, the controller does not monitor the expected functionality during execution of the SMM BIOS code at operation 406. The SMM BIOS code is an operating mode in which separate software is executed in high-privileged mode. During this mode, the processor remains on to execute the SMM BIOS code. If the controller determines the processor is executing the boot strap information, this indicates the computing device is in pre-execution mode, meaning the processor has not yet entered the mode for execution of the SMM BIOS thus making it infeasible for the controller to monitor the expected functionality as a result of executing the SMM BIOS code.

At operation 406, upon determining that the execution of the boot strap information is complete by the processor, the controller monitors the expected functionality upon execution of the SMM BIOS code by the processor. Upon completing the execution of the boot strap information, the processor signals to the controller the completion. This signifies to the controller that the processor is proceeding to execute the SMM BIOS code. This in turn indicates to the controller to begin monitoring the expected functionality. Monitoring the expected functionality upon the execution of the SMM BIOS code means the processor remains powered on from executing the hoot strap information to proceeding to execute the SMM BIOS code. Operation 406 involves the use of mechanism which tracks expected behavior of the SMM BIOS code. The expected behavior may be put into place by a developer such that when the SMM BIOS code is executed, a particular functionality occurs. Including particular functionality enables provides behavior as result of executing the SMM BIOS code, thus making the particular functionality as observable by the controller. Thus, the expected functionality is that behavior and/or functionality which is anticipated upon execution of the SMM BIOS code. As such, since the functionality is considered expected or anticipated according to the programming placed into the SMM BIOS code by the developer. The controller monitors this expected functionality to detect whether there may be the deviation in this expected functionality as at operation 410. By way of example, controller monitors such expected functionalities including, but not limited to: how often the processor executes the SMM BIOS code; an amount of time the processor spends executing the SMM BIOS code; monitoring settings of particular registers; and tracking a number of I/O cycles generated from execution of the SMM BIOS code. The examples are described in detail in the next figure. Operation 406 may be similar in functionality to operation 302 as in FIG. 3.

At operation 408, the controller detects the change to the SMM BIOS code in response to monitoring the expected functionality as at operation 406. In this implementation, the controller detects the change to the slum BIOS code through indirect monitoring of the SMM BIOS code. The indirect monitoring of the SMM BIOS code includes monitoring the expected functionality as the result of execution of the SMM BIOS code and detecting whether there may be the deviation in this expected functionality such as at operation 410. Operation 408 may be similar in functionality to operation 304 as in FIG. 3.

At operation 410, the controller determines whether there was the deviation in the expected functionality. The deviation is an unexpected functionality which the controller detects by monitoring the expected functionality from execution of the SMM BIOS code. For example, assume the expected functionality includes writing a specific value to one of the registers, thus the controller checks to verify if the specific value is in that register. If there is no specific value or if the value is something other than the specific value, this indicates the deviation in the expected functionality. If the controller determines there is no deviation in the expected functionality, the controller proceeds to operation 414 and does not transmit an alert or notification. If the controller determines there is the deviation in the expected functionality, this indicates there was an unauthorized change to the SMM BIOS code which produced the deviation. As such, the controller proceeds to operation 416 to transmit the alert of the deviation.

At operation 412, upon detecting no deviation in the expected functionality, the controller does not transmit the alert. Detecting no deviation in the expected functionality means the controller did not detect the change in the SMM BIOS code, meaning the SMM BIOS code may not be compromised.

At operation 414, the controller transmits the alert of the deviation in the expected functionality. The deviation in the expected functionality indicates the change to the SMM BIOS code, thus further indicating the SMM BIOS code has been compromised. The compromised situation of the SMM BIOS code means the SMM BIOS code may be corrupt and/or may include an unauthorized modification of the SMM BIOS code.

Figure 5:
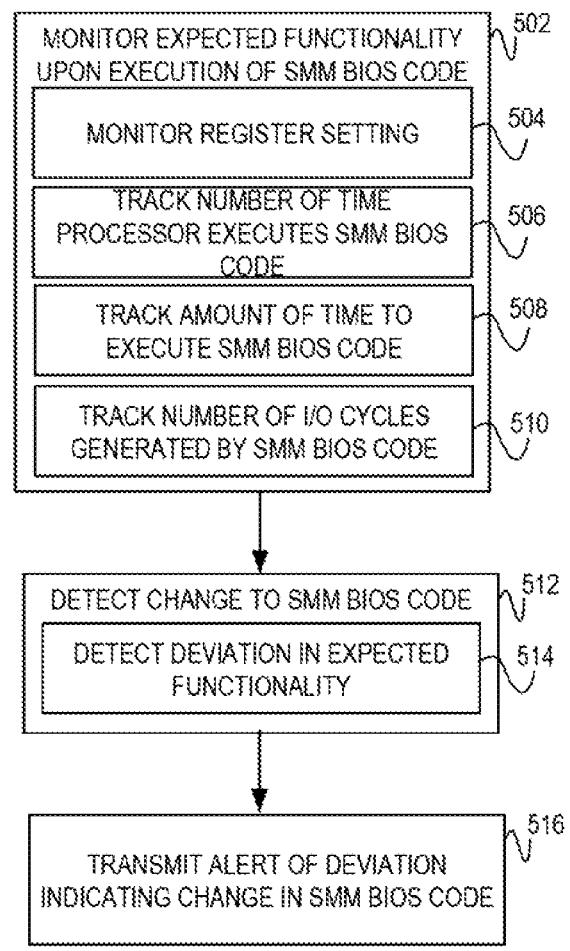
FIG. 5 is a flowchart of an example method executable by a controller for monitoring at least one expected functionality upon execution of SMM BIOS code, the controller detects a change in the SMM BIOS code detecting whether there may be a deviation in the expected functionality.

FIG. 5 is a flowchart of an example method executable by a controller for monitoring an expected functionally during execution of SMM BIOS code. The controller monitors the expected functionality by monitoring at least one of the functionalities including: monitoring a register setting of a computing device; tracking a number of time in which a processor enters the SMM BIOS mode for execution; tracking an amount of time it takes for the processor to execute the SMM BIOS code; and tracking a number of I/O cycles which may be generated upon the execution of the SMM BIOS code. Additionally, although FIG. 5 depicts the above-referenced functionalities, implementations should not be limited as this was done for illustration purposes. For example, the controller may also monitor specific clock signals at the processor or other type of observable behavior.

The controller monitors at least one of these functionalities for detecting a change to the SMM BIOS code indicating the SMM BIOS code has been compromised. The controller detects the change to the SMM BIOS code by detecting a deviation of the expected functionality. The expected functionality is art expected behavior that occurs when the SMM BIOS code is executed. The deviation is an unexpected functionality in the sense it is a behavior which is considered abnormal and indicates the functionality integrity of the computing device may be at risk. As such, enabling the controller to monitor the expected functionality provides a mechanism for the controller to track the behavior for observing an abnormality which may be caused as an effect of the execution of the SMM BIOS. In discussing FIG. 5, references may be made to the components in FIGS. 1-2 to provide contextual examples. For example, the processor 102 as in FIGS. 1-2 executes the SMM BIOS code for the controller to monitor the expected functionality during the SMM BIOS code execution as at operation 502. In another example, the controller 110 as in FIGS. 1-2 executes operations 502-516 to detect whether there was a change to the SMM BIOS code. Further, although. FIG. 5 is described as implemented by the controller, it may be executed on other suitable components. For example, FIG. 5 may be implemented in the form of executable instructions on a machine-readable storage medium 604 as in FIG. 6.

At operation 502, the controller monitors the expected functionality of the computing device upon execution of the SMM BIOS code by the processor. The processor transmits a signal to the controller indicating the processor is in the process of entering the SMM BIOS mode. This signal indicates to the controller to monitor the expected functionality during the process of executing the SMM BIOS code. The controller may be programmed with guidance indicating when the processor executes the SMM BIOS code, the controller reacts by monitoring the expected functionality. The expected functionality is a behavior that occurs during execution of the SMM BIOS code. As such, a developer may create the behavior which may be observable by the controller. Monitoring this particular behavior enables the controller to operate as a watcher to monitor the expected functionality. At operation 502, the controller may operate to observe at least one of the functionalities as at operations 504-510. In this implementation, at least one of these functionalities may be made observable by the developer. In this manner, these functionalities may be observable by the controller enabling the controller to expect particular behaviors from these functionalities. Operation 502 may be similar in functionality to operations 302 and 406 as in FIGS. 3-4.

At operation 504, the controller may monitor the settings of one of the registers internal to the computing device. The register may include a register to the processor which executes the SMM BIOS code or other type of hardware register. These registers provide a placeholder for value which may include storing information about a particular condition of the processor or storing other information. The controller may track the value at the register to determine whether that value should be the expected value when executing particular portions of the SMM BIOS code. If the value is not the expected value, this may indicate the deviation in the expected functionality. For example, assume the processor register is expected to store a "0," bit upon execution of the SMM BIOS code, yet the processor register stores a "1," bit. This indicates the deviation in the expected functionality indicating the change to the SMM BIOS code.

At operation 506, the controller tracks the number of times the processor enters the SMM BIOS mode for executing the SMM BIOS code. As such, the controller determines whether processor has reached a threshold number of times in which to executes the SMM BIOS code. In this implementation, if the processor reaches this threshold number or surpasses the threshold number of times to enter the SMM BIOS mode, this signals the deviation to the controller.

At operation 508, the controller tracks the amount of time in which the processor executes the SMM BIOS code. The controller uses a specific amount of time as the threshold to indicate if the amount of time the processor takes to execute the SMM BIOS code is abnormal. If the processor takes at least the specific amount of time or more, this indicates to the controller the abnormality or deviation in the expected functionality. This deviation indicates the change the SMM BIOS code, accordingly.

At operation 510, the controller tracks the number of I/O cycles that is generated by the processor executing the SMM BIOS code. The number of I/O cycles may include the number of messages that occur upon the execution of the SMM BIOS code to the controller. Thus the messaging to the controller enables the controller to track the number of I/O cycles that is generated upon the execution of the SMM BIOS code. Thus, the controller may track the number of I/O cycles that should be generated each time the processor executes the SMM BIOS code. Thus, if this number is not reached or is surpassed, this indicates the deviation or abnormality in the functionality of executing the SMM BIOS code.

At operation 512, the controller detects the change in the SMM BIOS code from monitoring the expected functionality during execution of the SMM BIOS code as at operation 502. In one implementation, detecting the change to the SMM BIOS code includes the indirect monitoring of the SMM BIOS code. In this implementation, the controller detects the deviation in the expected functionality as at operation 514. Indirect monitoring includes monitoring the expected functionality to determine whether the SMM BIOS code has maintained functionality integrity of the computing device. Operation 512 may be similar in functionality to operation 408 as in FIG. 4.

At operation 514, if the controller detects the deviation to the expected functionality, this deviation indicates there is the change in the SMM BIOS code. The deviation is the unexpected functionality which occurs when the processor executes the SMM BIOS code. A developer develops code within the SMM BIOS code in such a manner that the when the processor executes this code, there are certain behaviors that occur upon the execution of the SMM BIOS code. The deviation may include an absence and/or change to those certain behaviors. Detecting the change through detection of the deviation in the expected functionalities indicate the SMM BIOS code may be compromised. Accordingly, the controller may transmit a notification or alert of this change as at operation 516. Operation 514 may be similar in functionality to operation 410 as in FIG. 4.

At operation 516, upon detecting the change to the SMM BIOS code as at operation 512, the controller may proceed to transmit the alert of the change to the SMM BIOS code. Operation 516 may be similar in functionality to operation 414 as in FIG. 4.

Figure 6:
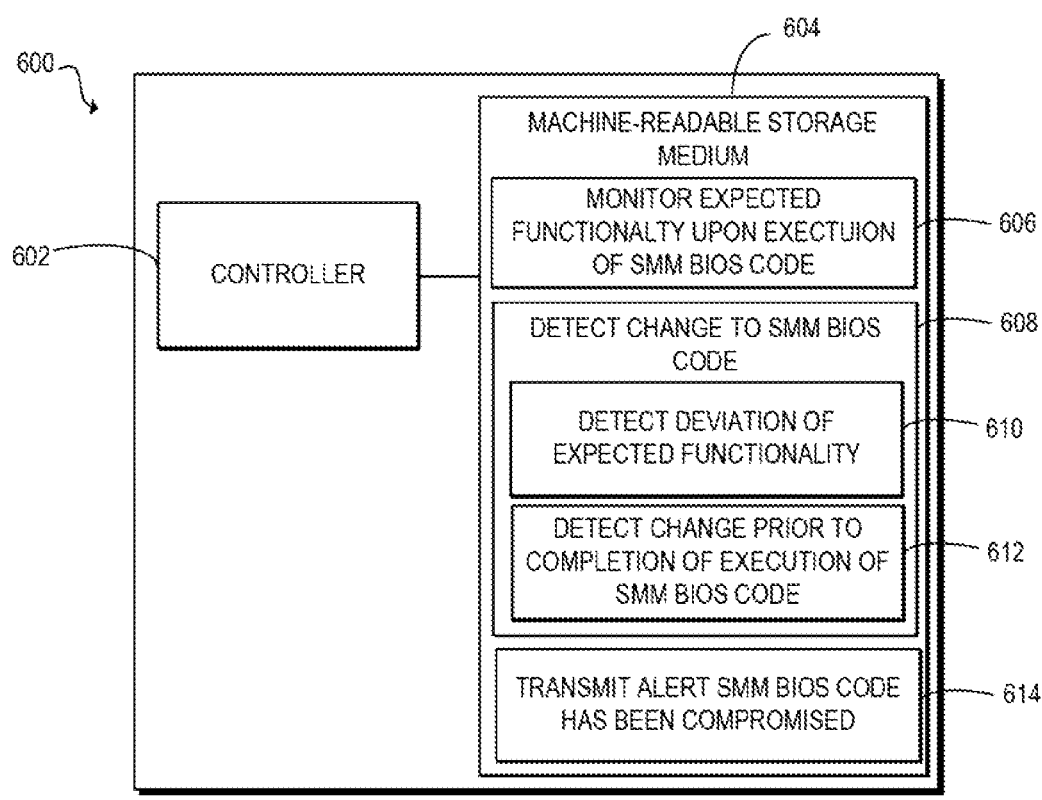
FIG. 6 is a block diagram of an example computing device with a processor to execute instructions in a machine-readable storage medium for monitoring an expected functionality during executing of SMM BIOS code and detecting whether the SMM BIOS code has changed.

FIG. 6 is a block diagram of a computing device 600 with controller 602 to execute instructions 606-614 with a machine-readable storage medium 604. Specifically, the computing device 600 with the controller 602 is to execute instructions 606-614 for monitoring an expected functionality to the computing device 600 during execution of the SMM BIOS code. The controller 602 is to monitor the expected functionality during execution of the SMM BIOS code for detecting a change to the SMM BIOS code. The controller 602 may also execute instructions 606-614 for transmitting an alert if the controller 602 detects the change to the SMM BIOS code as the change indicates that the SMM BIOS code has been compromised.

Although the computing device 600 includes controller 602 and machine-readable storage medium 604, it may also include other components that would be suitable to one skilled in the art. For example, the computing device 600 may include the processor 102 as in FIG. 1 to execute the SMM BIOS code. The computing device 600 is an electronic device with the controller 602 capable of executing instructions 606-614, and as such embodiments of the computing device 600 include a computing device, mobile device, client device, personal computer, desktop computer, laptop, tablet, video game console, or other type of electronic device capable of executing instructions 606-614. The instructions 606-614 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The controller 602 may fetch, decode, and execute instructions 606-614 for detecting whether the SMM BIOS code has been compromised through monitoring the excepted functionality upon execution of SMM BIOS code. In one implementation, the controller 602 executes the instructions 606-608 for detecting the change to SMM BIOS code by monitoring the expected functionality and detecting if there is a deviation in this expected functionality. In another implementation upon executing instructions 606-612, the controller 602 executes instruction 614 for detecting the change to the SMM BIOS code by monitoring expected functionality of the SMM BIOS code during execution and detecting a deviation in the expected functionality. Specifically, the controller 602 executes instructions 606-608 to: monitor the expected functionality of the computing device 600 when the SMM BIOS is executed; and detect the change to the SMM BIOS code through monitoring the expected functionality. The controller 602 proceeds to detect the change to the SMM BIOS through execution of instructions 610-612 to: detect the deviation of the expected functionality; and detect the change prior to completion of execution of the SMM BIOS code. The controller 602 proceeds to transmit the alert the SMM BIOS code has been compromised upon detection of the change, the processor 602 executes instruction 614 to: transmit the alert of the change of the SMM BIOS code indicating the SMM BIOS code has been compromised.

The machine-readable storage medium 604 includes instructions 606-614 for the controller 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the controller 602 to fetch, decode, and/or execute instructions of the machine-readable storage medium 604. The application and/or firmware may be stored on the machine-readable storage medium 604 and/or stored on another location of the computing device 600.

Thus, examples disclosed herein provide a mechanism to detect whether SMM BIOS code has been compromised by monitoring an expected functionality during execution of the SMM BIOS code.

We claim:

1. A system comprising:
  a processor to execute a system management mode (SMM) code; and
  instructions to:
    monitor an expected functionality of the SMM code upon the execution of SMM Basic Input/Output System (BIOS) code by tracking a number of times the processor executes the SMM BIOS code; and
    detect whether a change has occurred to the SMM code based on the monitoring of the expected functionality of the SMM code, the change indicating that the SMM code is compromised.

2. The system of claim 1 comprising:
  a memory associated with the processor to maintain the SMM code for execution by the processor.

3. The system of claim 1 wherein the processor is to execute the SMM code during runtime of an operating system.

4. The system of claim 1 wherein:
the processor is to complete execution of boot strap information of BIOS code prior to execution of the SMM code.

5. The system of claim 1 wherein the expected functionality is a particular behavior which is expected upon the execution of the SMM code and wherein the detection of the change to the SMM code, the instructions are to:
detect a deviation in the expected functionality of the SMM code, the deviation in the expected functionality indicates the change in the SMM code.

6. A method comprising:
monitoring, via instructions, an expected functionality upon execution of system management mode (SMM) firmware code by tracking a number of times a processor executes the SMM firmware code, by tracking a number of input/output cycles generated by the SMM firmware code, or a combination thereof; and
detecting, via instructions, whether a change has occurred to the SMM firmware code based on the monitoring of the expected functionality, the detection of the change occurs prior to completion of execution of the SMM firmware code, the change indicating that SMM Basic Input/Output System (BIOS) code is compromised.

7. The method of claim 6 comprising:
completing execution of boot strap information of BIOS firmware code prior to monitoring the SMM firmware code during execution.

8. The method of claim 6 wherein the expected functionality is a particular behavior which is expected upon the execution of the SMM firmware code and wherein detecting whether a change has occurred to the SMM firmware code based on the monitoring of the expected functionality comprises:
detecting a deviation in the expected functionality of the SMM firmware code, the deviation in the expected functionality indicates the change in the SMM firmware code.

9. The method of claim 6 comprising:
transmitting an alert of the change in the SMM firmware code, the change indicates the SMM firmware code has been compromised.

10. A non-transitory computer-readable storage medium comprising instructions that when executed cause a computing device to:
monitor an expected functionality upon execution of a system management mode (SMM) code by tracking a number of input/output cycles generated by the SMM code; and
detect whether a change has occurred to the SMM code based on the monitoring of the expected functionality, the change indicating that the SMM code is compromised.

11. The non-transitory computer-readable storage medium including the instructions of claim 10 wherein the detection of whether the change has occurred to the SMM code based on the monitoring of the expected functionality is including instructions that when executed cause the computing device to:
detect a deviation in the expected functionality of the SMM code, the deviation in the expected functionality indicates the change in the SMM code.

12. The non-transitory computer-readable storage medium including the instructions of claim 10 wherein the expected functionality is a particular behavior resulting from execution of the SMM code which becomes observable by instructions.

13. The non-transitory computer-readable storage medium including the instructions of claim 10 wherein to detect whether the change has occurred to the SMM code based on the monitoring of the expected functionality is including instructions that when executed cause the computing device to:
detect the change prior to completion of execution of the SMM code.

14. The non-transitory computer-readable storage medium including the instructions of claim 10 and including instructions that when executed cause the computing device to:
transmit an alert of the change indicating the SMM code has been compromised based upon the detection of the change to the SMM code.

* * * * *